Nov. 11, 1941.  G. P. WOODBURY  2,262,077
MACHINE FOR USE IN MAKING BOXES
Filed July 7, 1939   5 Sheets-Sheet 4
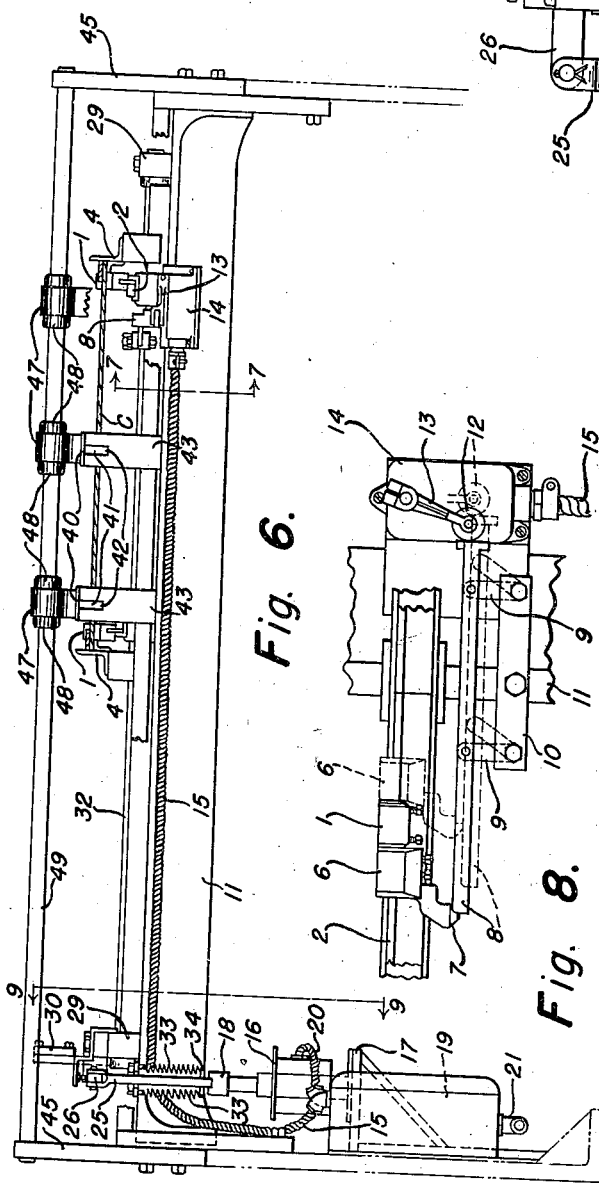
INVENTOR.
Glen P. Woodbury
BY Edward F. Dunne
ATTORNEY.

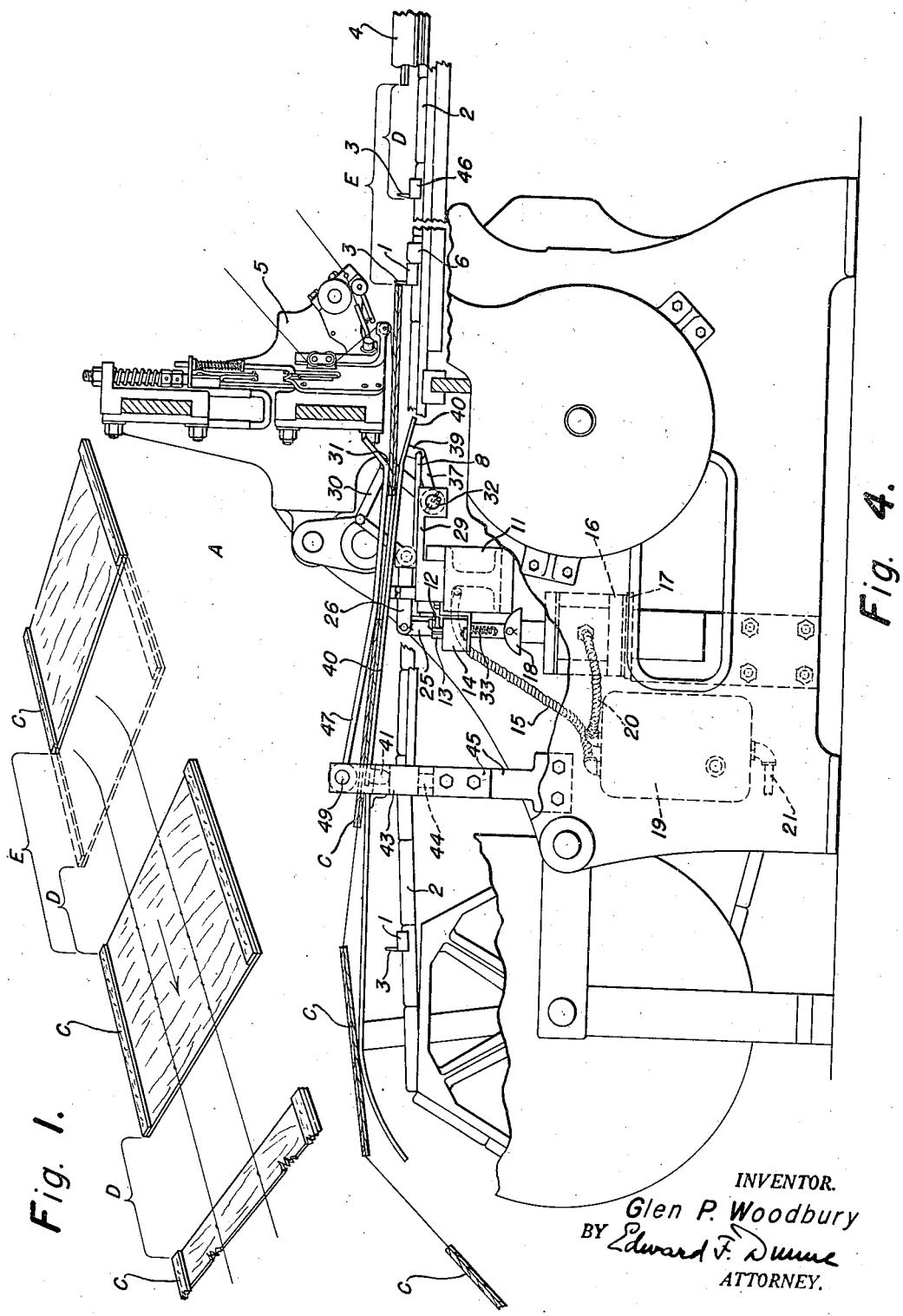

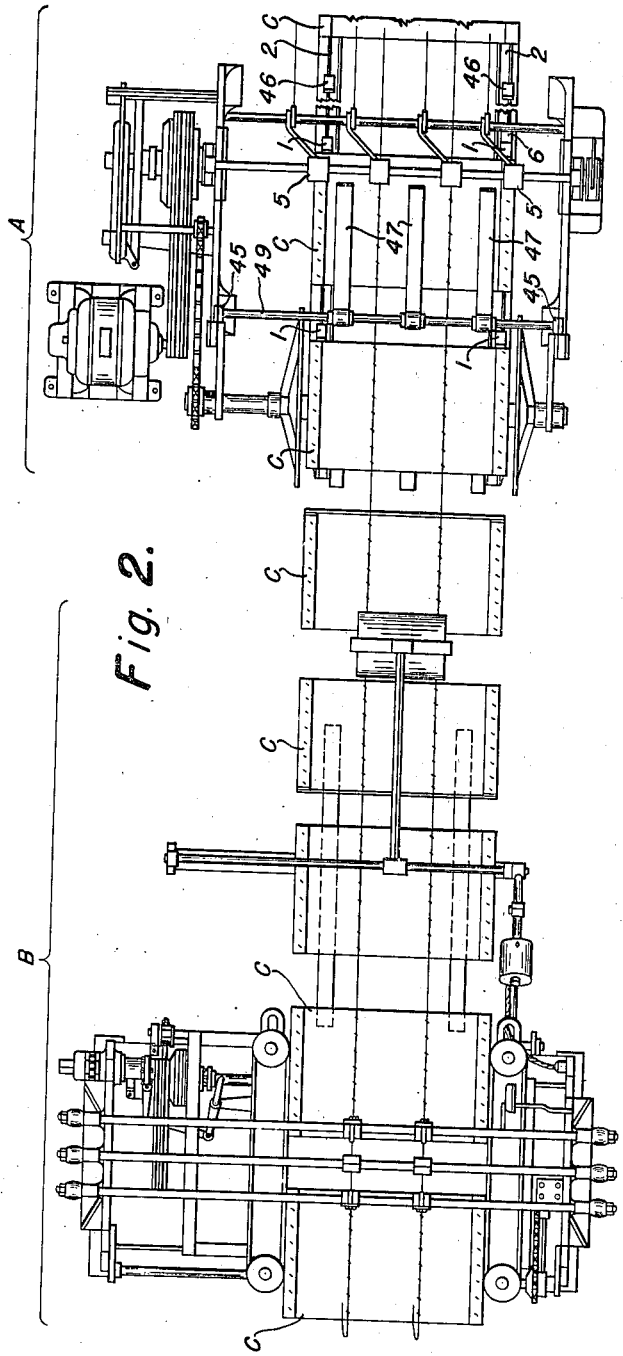

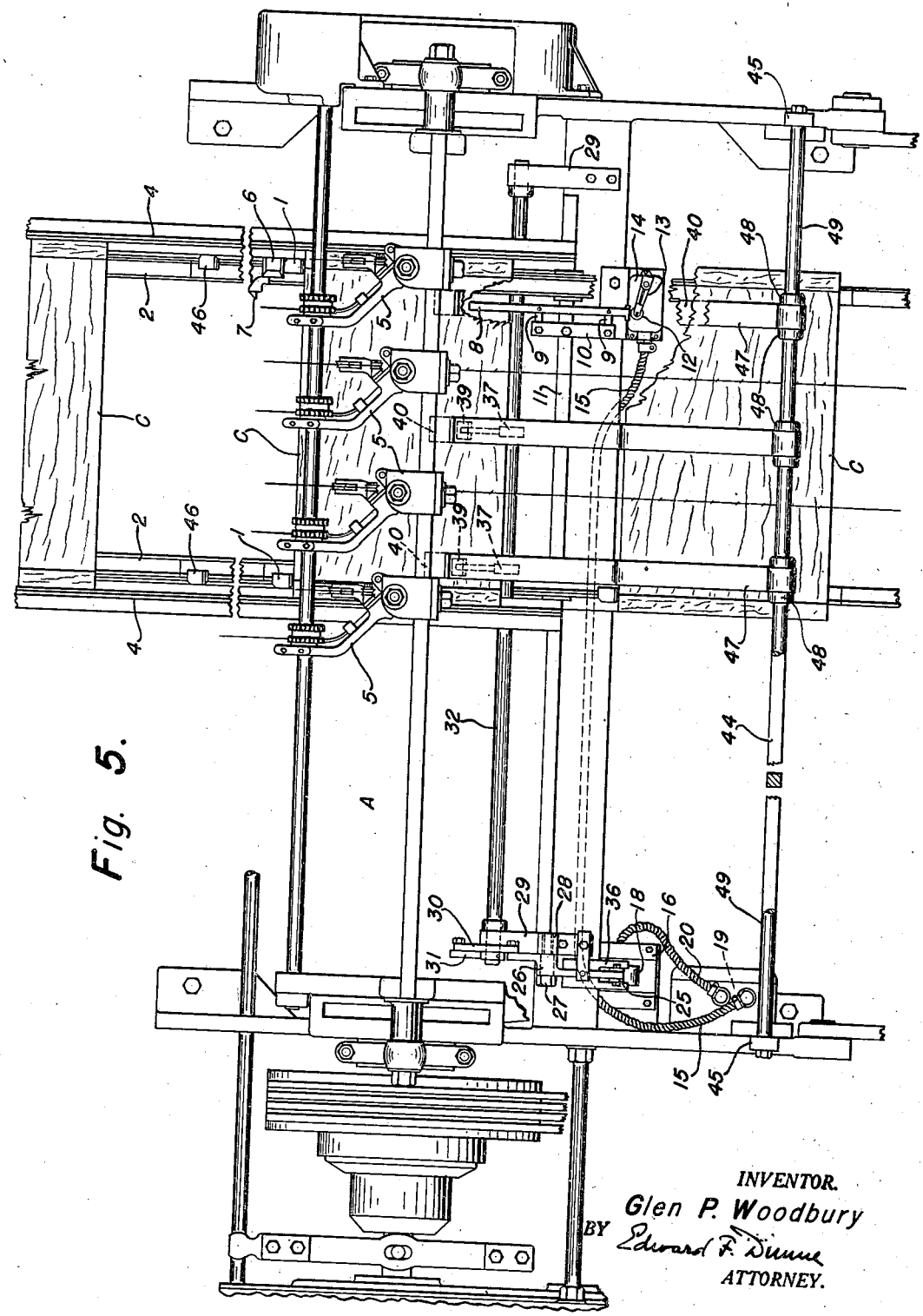

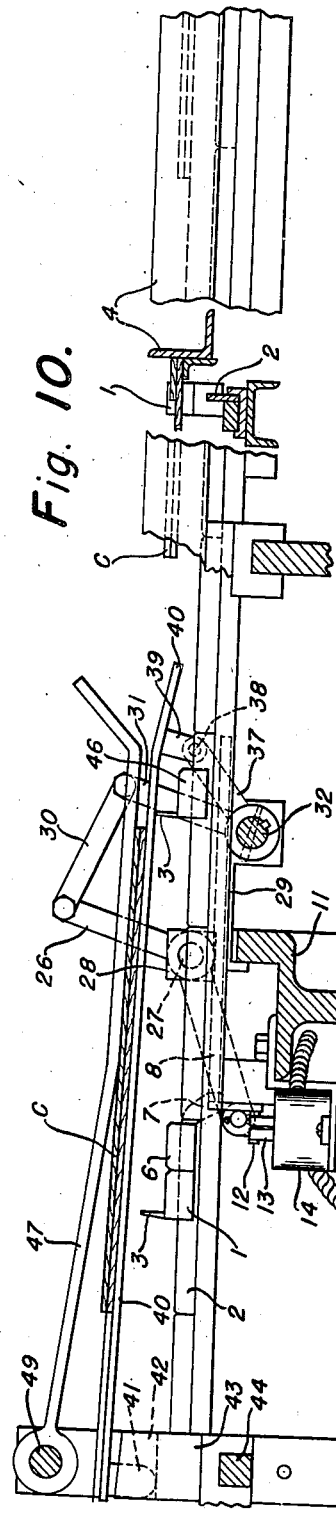
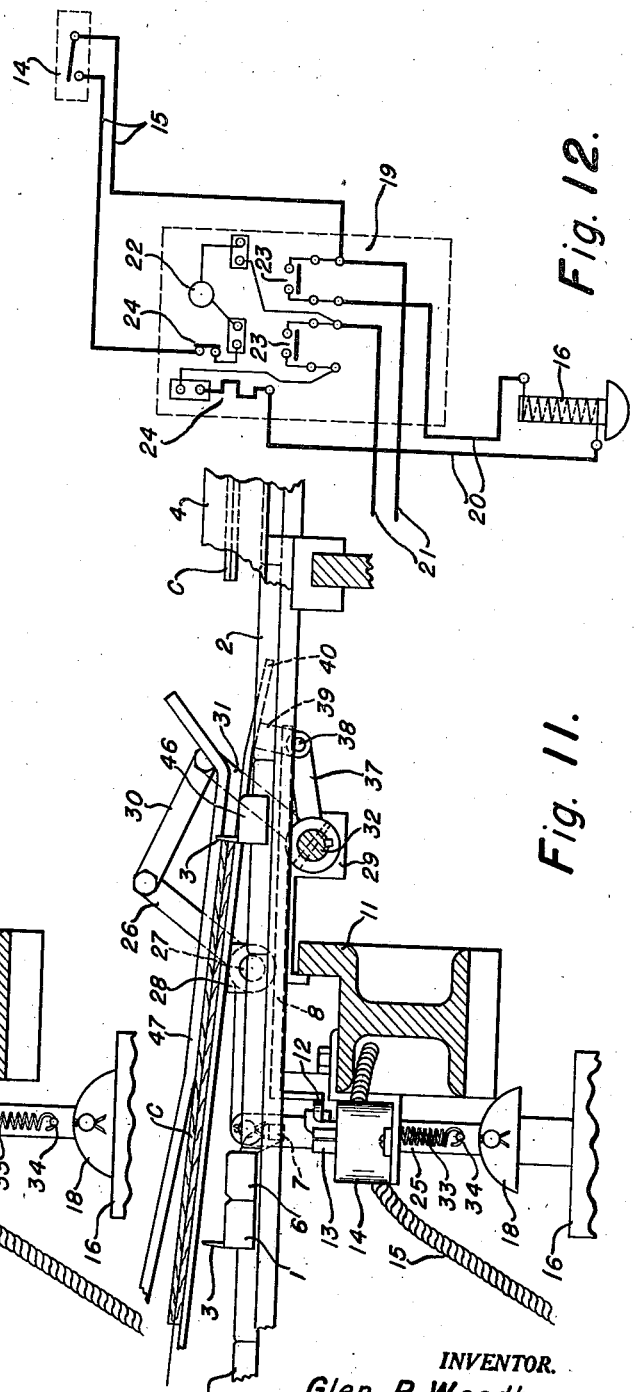

Patented Nov. 11, 1941

2,262,077

UNITED STATES PATENT OFFICE 2,262,077

MACHINE FOR USE IN MAKING BOXES

Glen P. Woodbury, Mountain Lakes, N. J., assignor to Stapling Machines Co., a corporation of Delaware Application July 7, 1939, Serial No. 283,166

12 Claims. (Cl. 1—8.3)

This invention relates to machines for making wired box parts and particularly to machines for stapling binding wire to a succession of properly related box parts.

It is an object of the invention to provide mechanism for adjusting the relative positions of adjacent box parts during their passage through the machine.

It is a further object of the invention to provide an automatic control for said adjusting mechanism.

It is a further object of the invention to interrupt the feed of one box part until a following box part has reached a predetermined point relative to the first box part.

Other objects will be obvious from the description which follows.

As conducive to a better understanding of this invention, it should be noted that the invention may be embodied to particular advantage in a machine of the type shown in U. S. patent to Rosenmund, No. 2,161,200, dated June 6, 1939. In the machine of said Rosenmund patent, a succession of box parts are positioned on endless conveyers by means of positioning blocks adjustably secured to the endless conveyers and are fed beneath stapling mechanism which secures binding wires to the box parts. After passing through the stapling unit of the machine, the wired box parts are fed through a fastener supplying unit which severs the wires between adjacent box parts, bends the severed wires to form loops or bights, and drives the ends of the wires into the box parts to perpetuate the loops or bights. It is desirable that the loops or bights for each box part be uniformly located a predetermined distance from the box part edge. To insure this definite uniformity in the location of the loops or bights, the spaces between the wired box parts must be definite and uniform. Because the box parts are positioned on an endless conveyer in the stapling unit, it frequently happens, depending upon the dimensions of the particular box part being operated upon, that one of the spaces between box parts is greater than the uniform space required. For example, if the endless conveyers are 400 inches in length, and the dimensions of each box part lengthwise the conveyer is 11 inches and the required tie wire space between box parts is 9 inches, 20 box parts may be positioned in one cycle of the endless conveyers, with uniform spaces of 9 inches between box parts, but if each box part being operated upon has a dimension of 23 inches lengthwise the conveyer and the required tie wire space is 9 inches, then 12 box parts may be positioned in one cycle of the endless conveyers, with 9-inch spaces between all adjacent box parts except between the last and the first box part in the cycle, which space would be 25 inches. The present invention is intended automatically to reduce this tie wire space of 25 inches to 9 inches after the last box part in a cycle of box parts has been stapled and prior to the stapling of the first box part in the next cycle. This is accomplished in the manner hereinafter explained by interrupting the feed of the last box part of the cycle after it has been wired, until the next following box part approaches within 9 inches of the wired box part.

It will be understood that the foregoing figures as to dimensions of box parts, length of conveyers, and length of tie wire spaces are illustrative. They all may be varied to suit different conditions.

In the drawings:

Figure 1 is a perspective view of a succession of box parts showing a proper tie wire space between two of the box parts and a longer tie wire space between two other box parts.

Fig. 2 is a top plan view of a machine embodying the invention, showing how a succession of wired box parts are fed from the stapling unit A to the fastener supplying unit B.

Fig. 3 is a side elevation of Fig. 2.

Fig. 4 is an enlarged side elevation of the stapling unit.

Fig. 5 is a top plan view of a portion of the stapling unit shown in Fig. 4.

Fig. 6 is a rear elevation taken from the bottom of Fig. 5, with certain parts omitted for clearness of illustration.

Fig. 7 is an enlarged sectional view taken on the line 7—7 of Fig. 6.

Fig. 8 is a top plan view of Fig. 7, showing, in broken lines, how the electric switch is held closed for a predetermined period of time.

Fig. 9 is an enlarged sectional view taken on the line 9—9 of Fig. 6.

Fig. 10 is a skeleton view showing the automatic stripper in raised position, holding the box part above the primary positioning blocks while the following box part moves up a sufficient distance to make a correct tie wire gap.

Fig. 11 is a skeleton view showing the automatic stripper returned to its initial position to place the edge of the box part in the path of the secondary positioning blocks.

Fig. 12 is a wiring diagram of the electrical control of the automatic stripper.

In Fig. 1 is shown a succession of box parts C as they might be positioned on the endless conveyers of the stapling unit of the machine. The tie wire space D between two of the box parts is the proper or standard tie wire space. The tie wire space E between two other box parts is longer than the standard tie wire space D and must be reduced to the standard tie wire space before the binding wires are stapled to the oncoming box part. This is done by arresting the movement of the wired box part until the oncoming box part has been fed to the position shown in dotted lines in Fig. 1.

The box parts C to be wired are positioned against primary positioning blocks 1 (Fig. 4) adjustably secured to endless conveyers 2 and are fed beneath staplers 5 in the stapling unit A. The conveyer feeding mechanism and the staplers are well known and need not be described herein. Each box part C plus a standard tie wire space D determines the position of the primary positioning blocks 1 which are adjustably secured on the endless conveyer chains 2. From the body of the primary positioning blocks 1 there is an upwardly extending fin 3 which engages and moves a box part C when the machine is in operation. As these setups or spaces are made along the endless conveyer chains 2, there usually occurs a long tie wire space E between the last setup and the first setup.

As shown in Figs. 4, 5, and 6, a primary positioning block 1 moves box part C forward on a combination guide and support 4. After the box part C passes beneath the staplers 5, it is pushed upon vertically movable strippers 40 which are set at a slight incline (see Fig. 4) and is held firmly thereon by a gravity-type presser 47. Adjacent the primary positioning block 1 there is adjustably secured, preferably on the left conveyer chain 2 (see Fig. 5), a trip block 6 which contacts a trip bar 8, shown clearly in Figs. 7 and 8. The trip bar 8 contacts an electric switch 14 which energizes a solenoid 16, causing a rock shaft 32 to rock and raise movable strippers 40 as hereinafter explained. Thus, the movable strippers 40 with the wired box part resting thereon are raised above the fins 3 of primary positioning blocks 1 and the box part remains stationary (Fig. 10) while the conveyer chains 2 with a set of secondary positioning blocks 46 located the proper tie wire distance from the next following box part continue to move forward to engage the rear edge of the wired box part when the solenoid 16 is deenergized to permit the movable strippers 40 to return to their initial position (Fig. 11).

As shown in Fig. 5 and more clearly in Figs. 7 and 8, the trip block 6 for actuating the switch 14 to operate the strippers 40 is secured on the left conveyer chain 2 just after and adjacent to the primary positioning block 1. Projecting from the inside surface of trip block 6 is a finger 7 designed to contact the end of trip bar 8 hinged on links 9 loosely pivoted to a bracket 10 mounted on a cross-tie 11. The continued pressure of trip block finger 7 against the trip bar 8 causes it to move forward against a roller 12 of a switch lever 13, thus actuating switch 14 to close the circuit in wires housed in a cable 15.

By means of wires in cable 15, switch 14 is connected electrically to a magnetic switch 19, to which is also connected solenoid 16 by means of wires in a cable 20. Alternating current is supplied to magnetic switch 19 by means of a cable 21. As shown by diagram in Fig. 12, magnetic switch 19 is energized by current which passes through cable 21 to magnetic switch 19 and through cable 15 to switch 14 which, when closed, energizes magnetic coil 22 and closes contacts 23. When contacts 23 are closed, the current passes through cable 21 to magnetic switch 19 and through cable 20 to solenoid 16, which causes a solenoid plunger 18 to actuate linkage hereinafter described. Thus, solenoid 16 remains energized for the same period as switch 14 remains closed. A relay 24 is connected electrically between contacts 23 and solenoid 16 as a protection for solenoid 16 and will disconnect the circuit in case of overload on solenoid 16.

As trip bar 8 moves forward, it also swings out of the path of finger 7 which then slides against the side of trip bar 8, shown in broken lines in Fig. 8. Thus, the solenoid 16 will be energized until the trip block 6 moves beyond the end of trip bar 8 (Fig. 11) which will then be returned to its initial position by the spring action of switch lever 13, at which time the circuit will be open and the solenoid 16 deenergized.

Referring now to Figs. 4 and 9, there is shown appropriate linkage connecting rock shaft 32 to the actuating force or solenoid 16 securely mounted on bracket 17 fastened to the main frame of the machine. A link 25 connected to the solenoid plunger 18 transmits motion through its connection to a bell-crank 26 loosely mounted on a stud 27 in a block 28 of a bracket 29. Bell-crank 26 is connected by a link 30 to a lever 31 which is pinned to rock shaft 32, and when the solenoid 16 is energized the linkage described above will move from the position shown in Figs. 9 and 11 to the position shown in Fig. 10. To return solenoid plunger 18 and linkage to a nonoperative position, there is provided a pair of springs 33, one end of each spring being secured in studs 34 in the side of link 25 and the other end of each spring being fastened in studs 35 secured in a slotted plate 36 permanently secured to cross-tie 11.

As illustrated by broken lines in Fig. 5 and by full lines in Figs. 10 and 11, levers 37, adjustably keyed on rock shaft 32 and pivoted at 38 in a downwardly projecting jaw 39, are secured to the under surface of movable strippers 40. From the under surface of the opposite end of the movable strippers 40 is a projection 41 which is free to move horizontally in a slot 42 of a bracket 43 mounted on a cross-bar 44 which is supported at either end by members 45. Energizing the solenoid 16 causes rock shaft 32, which is journaled at either end in bearings in brackets 29, to rock and raise movable strippers 40 from the position shown in Figs. 4 and 11 to that shown in Fig. 10. Thus, the box part is raised above the primary positioning blocks 1 (Fig. 10) until the solenoid 16 is deenergized, and is then returned (Fig. 11) to the path of the secondary positioning blocks 46. To insure that the box part will rest firmly on the upper surface of the movable strippers 40, gravity-type pressers 47 are provided. The pressers 47, which are positioned laterally by collars 48, have one end freely mounted on cross-shaft 49 which has its ends secured in members 45 an appropriate distance above the movable strippers 40. The other end of the pressers 47 is bent upwardly at an angle to facilitate the forward movement of the incoming box part, while the remaining portion of the pressers 47 is so shaped as to rest upon the top surface of the movable strippers 40 until a box part is pushed therebetween.

After the strippers 40 have raised a box part above the primary positioning blocks, the back pull of the binding wires which have been stapled to the box part will assist the pressers 47 in holding the box part stationary on the strippers 40.

The operation of the stripper mechanism will be clear from the foregoing description. With primary positioning blocks 1, secondary positioning blocks 46, and trip block 6 properly positioned on endless conveyors 2, the machine is started. The attendant places the box parts in front of each set of primary positioning blocks 1. When the trip block finger 7 of trip block 6 engages and moves trip bar 8, solenoid 16 is energized, causing shaft 32 to rock and raise strippers 40. With strippers 40 in raised position, the box part is held out of contact with the primary positioning blocks 1 and remains stationary until the strippers 40 are returned to initial position. This occurs when trip finger 7 passes the end of trip bar 8. Thereupon, the box part is lowered to be engaged by the secondary positioning block 46, which is located the proper tie wire distance ahead of the forward edge of the oncoming box part.

Among other advantages, the stripper mechanism of this invention contributes to uniformity of production, quality of product, and reduction in the cost of manufacture of boxes.

It will be understood that the invention is not to be limited to the specific embodiment shown for purposes of illustration.

I claim:

1. A machine for stapling binding wire to a succession of box parts, comprising stapling mechanism, an endless conveyer to feed the box parts to the stapling mechanism, primary box part positioning members carried by the endless conveyer, secondary box part positioning members carried by the endless conveyer, and a stripper to transfer a box part from a primary box part positioning member to a secondary box part positioning member during the operation of the machine.

2. A machine for applying a flexible binder to a succession of box parts, comprising fastener applying mechanism, a conveyer to feed the box parts to the fastener applying mechanism, primary box part positioning members carried by the conveyer, secondary box part positioning members carried by the conveyer, and means to transfer a box part from a primary box part positioning member to a secondary box part positioning member during the operation of the machine.

3. A machine for stapling box parts, comprising stapling mechanism, a conveyer to feed the box parts to the stapling mechanism, primary box part positioning members, secondary box part positioning members, and means to transfer a box part from a primary box part positioning member to a secondary box part positioning member.

4. A machine for applying a flexible binder to a succession of box parts, comprising mechanism for securing a flexible binder to box parts, a conveyer to position the box parts in spaced relationship and to feed them to said mechanism, and means to interrupt the feed of one box part while continuing the feed of a following box part after it has been acted upon by said securing mechanism to reduce the space between the two box parts.

5. A machine for applying a flexible binder to a succession of box parts, comprising mechanism for securing a flexible binder to box parts, a conveyer to position the box parts in spaced relationship and to feed them to said mechanism, and means to move a box part out of contact with the moving conveyer for a predetermined interval after it has been acted upon by said securing mechanism.

6. A machine for applying a flexible binder to a succession of box parts, comprising mechanism for securing a flexible binder to box parts, a conveyer to position the box parts in spaced relationship and to feed them to said mechanism, and means to move a box part out of contact with the moving conveyer for a predetermined interval and to return the box part to the conveyer.

7. A machine for applying a flexible binder to a succession of box parts, comprising mechanism for securing a flexible binder to the box parts, means to position the box parts in spaced relationship and to feed them to said mechanism, and means to interrupt the feed of a box part after it has been acted upon by said securing mechanism to permit a following box part to move into closer proximity thereto.

8. In a machine for applying a flexible binder to a succession of box parts, an endless conveyer for positioning and feeding the box parts, and a stripper for lifting a box part out of the conveyer during movement of the conveyer and for returning the box part to the conveyer.

9. In a machine for applying a flexible binder to a succession of box parts, a conveyer for positioning and feeding the box parts, and means for lifting a box part out of the conveyer during movement of the conveyer and for returning the box part to the conveyer.

10. In a machine for stapling a succession of box parts, stapling mechanism, a conveyer for positioning and feeding the box parts, and means for interrupting temporarily the feed of one box part after it has been stapled while continuing the feed of a following box part to reduce the space between the box parts.

11. In a machine for stapling a succession of box parts, stapling mechanism, a conveyer for positioning and feeding the box parts, and means automatically to interrupt temporarily the feed of a box part after it has been stapled while continuing the feed of a following box part to reduce the space between the box parts.

12. In a machine for stapling a succession of box parts, stapling mechanism, a conveyer for positioning and feeding the box parts, and electrically operable means to interrupt temporarily the feed of a box part after it has been stapled while continuing the feed of a following box part to reduce the space between the box parts.

GLEN P. WOODBURY.

CERTIFICATE OF CORRECTION.

Patent No. 2,262,077.  November 11, 1941.

GLEN P. WOODBURY.

It is hereby certified that error appears in the printed specification of the above numbered patent requiring correction as follows: Page 3, second column, line 4, claim 4, strike out the words "while continuing the feed of a following box part" and insert the same after "mechanism" in line 6, same claim; and that the said Letters Patent should be read with this correction therein that the same may conform to the record of the case in the Patent Office.

Signed and sealed this 16th day of December, A. D. 1941.

Henry Van Arsdale,
Acting Commissioner of Patents.

(Seal)